United States Patent
Aoki

(10) Patent No.: US 9,298,210 B2
(45) Date of Patent: Mar. 29, 2016

(54) CLOCK GATING CIRCUIT AND BUS SYSTEM

(71) Applicant: Sony Corporation, Tokyo (JP)

(72) Inventor: Sumie Aoki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 341 days.

(21) Appl. No.: 13/673,219

(22) Filed: Nov. 9, 2012

(65) Prior Publication Data

US 2013/0124907 A1 May 16, 2013

(30) Foreign Application Priority Data

Nov. 14, 2011 (JP) ................................. 2011-248148

(51) Int. Cl.
*G06F 1/00* (2006.01)
*G06F 1/04* (2006.01)
*G06F 1/32* (2006.01)
*G06F 1/26* (2006.01)

(52) U.S. Cl.
CPC ............... *G06F 1/04* (2013.01); *G06F 1/3237* (2013.01); *G06F 1/26* (2013.01); *Y02B 60/1221* (2013.01)

(58) Field of Classification Search
CPC ............... G06F 1/32; G06F 1/04; G06F 1/26
USPC .......................................................... 713/323
See application file for complete search history.

(56) References Cited

U.S. PATENT DOCUMENTS

2005/0243612 A1* 11/2005 Barth et al. .............. 365/189.05
2008/0162967 A1* 7/2008 Wilson et al. ................. 713/322

FOREIGN PATENT DOCUMENTS

JP 2008-305215 12/2008

* cited by examiner

*Primary Examiner* — Jaweed A Abbaszadeh
*Assistant Examiner* — Austin Hicks
(74) *Attorney, Agent, or Firm* — Hazuki International, LLC

(57) ABSTRACT

The present technology provides an excellent advantageous effect in terms of reducing power consumption of a bus system adapted to treat a transaction as a unit. Disclosed herein is a clock gating circuit including: a clock enable signal generation portion adapted to count the number of outstanding transactions in each of a plurality of regions into which a bus system is divided so as to generate a clock enable signal for each of the plurality of regions; and a masked clock generation portion adapted to mask a clock by using the clock enable signal for each of the plurality of regions so as to generate a masked clock.

10 Claims, 11 Drawing Sheets

FIG. 6

| TARGET REGION | INPUT START | OUTPUT COMPLETION |
|---|---|---|
| REGION #1 | START OF TRANSACTION OF MASTER #1 | COMPLETION OF TRANSACTION OF MASTER #1 |
| REGION #2 | START OF TRANSACTION OF MASTER #2 | COMPLETION OF TRANSACTION OF MASTER #2 |
| REGION #3 | ISSUANCE OF COMMAND FROM MASTER #1 TO SLAVE #1 | COMPLETION OF COMMAND FROM MASTER #1 TO SLAVE #1 |
| REGION #3 | ISSUANCE OF COMMAND FROM MASTER #2 TO SLAVE #1 | COMPLETION OF COMMAND FROM MASTER #2 TO SLAVE #1 |
| REGION #4 | ISSUANCE OF COMMAND FROM MASTER #1 TO SLAVE #2 | COMPLETION OF COMMAND FROM MASTER #1 TO SLAVE #2 |
| REGION #4 | ISSUANCE OF COMMAND FROM MASTER #2 TO SLAVE #2 | COMPLETION OF COMMAND FROM MASTER #2 TO SLAVE #2 |

CLOCK GATING CIRCUIT AND BUS SYSTEM

BACKGROUND

The present technology relates to a bus system, and more particularly, to a clock gating circuit for a bus system.

The power consumption of a bus system tends to grow larger with more masters and slaves connected, and as a result of a larger gate scale due, for example, to the introduction of a split bus protocol. Therefore, techniques have been proposed that are designed to control the supply of a clock so as to suppress the power consumption of a bus system. In a computing system using a plurality of buses, for example, a technique has been proposed to supply a clock only to the bus adapted to pass data (refer, for example, to Japanese Patent Laid-open No. 2008-305215).

SUMMARY

In the above related technique, a clock is supplied to each of the stages by generating a logical product of a request signal from the previous stage and a clock. That is, a clock is supplied only when data is input. With a split bus protocol used in recent bus systems, however, a request and a response to the request are executed separately and asynchronously in a transaction. As a result, it is inefficient to treat them individually.

In light of the foregoing, it is desirable to provide reduced power consumption of a bus system adapted to treat a transaction as a unit.

According to a first mode of the present technology, there is provided a clock gating circuit that includes a clock enable signal generation portion and masked clock generation portion. The clock enable signal generation portion counts the number of outstanding transactions in each of a plurality of regions into which a bus system is divided, thus generating a clock enable signal for each of the plurality of regions. The masked clock generation portion masks a clock by using the clock enable signal for each of the plurality of regions, thus generating a masked clock. This provides an advantageous effect of controlling a clock for each of the regions on a transaction-by-transaction basis.

Alternatively, in the first mode, the clock enable signal generation portion may increment the number of the outstanding transactions when a request is input to each of the plurality of regions, and may decrement the number of the outstanding transactions when a response to the request is output therefrom, thus counting the number of the outstanding transactions. The masked clock generation portion may mask the clock and output the masked clock when the number of the outstanding transactions is zero, and may output the clock as it is as the masked clock when the number of the outstanding transactions is one or more. This provides an advantageous effect of controlling a clock for each of the regions according to the number of the outstanding transactions.

Still alternatively, in the first mode, the clock enable signal generation portion may include a counter adapted to increment the number of the outstanding transactions when a request is input to each of the plurality of regions and decrement the number of the outstanding transactions when a response to the request is output therefrom, thus counting count the number of the outstanding transactions. The masked clock generation portion may include a clock enabler adapted to mask the clock and output the masked clock when the number of the outstanding transactions is zero, and output the clock as it is as the masked clock when the number of the outstanding transactions is one or more. This provides an advantageous effect of controlling a clock for each of the regions according to the number of the outstanding transactions counted by the counter.

According to a second mode of the present technology, there is provided a bus system that includes a plurality of request decoders, a plurality of request arbiters, a plurality of response decoders, a plurality of response arbiters, clock enable signal generation portion and masked clock generation portion. Each of the plurality of request decoders is provided to be associated with one of a plurality of masters so as to decode a request from the associated master. Each of the plurality of request arbiters is provided to be associated with one of a plurality of slaves so as to arbitrate requests decoded by the plurality of request decoders and output the requests to the associated slave. Each of the plurality of response decoders is provided to be associated with one of the plurality of slaves so as to decode a response from the associated slave. Each of the plurality of response arbiters is provided to be associated with one of the plurality of masters so as to arbitrate responses decoded by the plurality of response decoders and output the responses to the associated master. The clock enable signal generation portion counts the number of outstanding transactions in each of the regions so as to generate a clock enable signal for each of the plurality of regions by classifying the plurality of request decoders and the plurality of response arbiters in such a manner that the request decoder and response arbiter associated with the same master are classified into the same region or by classifying the plurality of request arbiters and the plurality of response decoders in such a manner that the request arbiter and response decoder associated with the same slave are classified into the same region. The masked clock generation portion masks a clock by using the clock enable signal for each of the plurality of regions so as to generate a masked clock. This provides an advantageous effect of controlling a clock for each of the regions on a transaction-by-transaction basis in the bus system.

Alternatively, in the second mode, the clock enable signal generation portion may increment the number of the outstanding transactions when a request is input to each of the plurality of regions, and may decrement the number of the outstanding transactions when a response to the request is output therefrom, thus counting the number of the outstanding transactions. The masked clock generation portion may mask the clock and output the masked clock when the number of the outstanding transactions is zero, and may output the clock as it is as the masked clock when the number of the outstanding transactions is one or more. This provides an advantageous effect of controlling a clock for each of the regions according to the number of the outstanding transactions in the bus system.

Still alternatively, in the second mode, the clock enable signal generation portion may include a counter adapted to increment the number of the outstanding transactions when a request is input to each of the plurality of regions and decrement the number of the outstanding transactions when a response to the request is output therefrom, thus counting the number of the outstanding transactions. The masked clock generation portion may include a clock enabler adapted to mask the clock and output the masked clock when the number of the outstanding transactions is zero, and output the clock as it is as the masked clock when the number of the outstanding transactions is one or more. This provides an advantageous effect of controlling a clock for each of the regions according to the number of the outstanding transactions counted by the counter in the bus system.

The present technology provides an excellent advantageous effect in terms of reducing power consumption of a bus system adapted to treat a transaction as a unit.

BRIEF DESCRIPTION OF THE DRAWINGS

FIG. 6 is a diagram illustrating examples of events triggering the start of input and completion of output for a target region in the clock gating section in the embodiment of the present technology;

DETAILED DESCRIPTION OF THE PREFERRED EMBODIMENT

Figure 1:
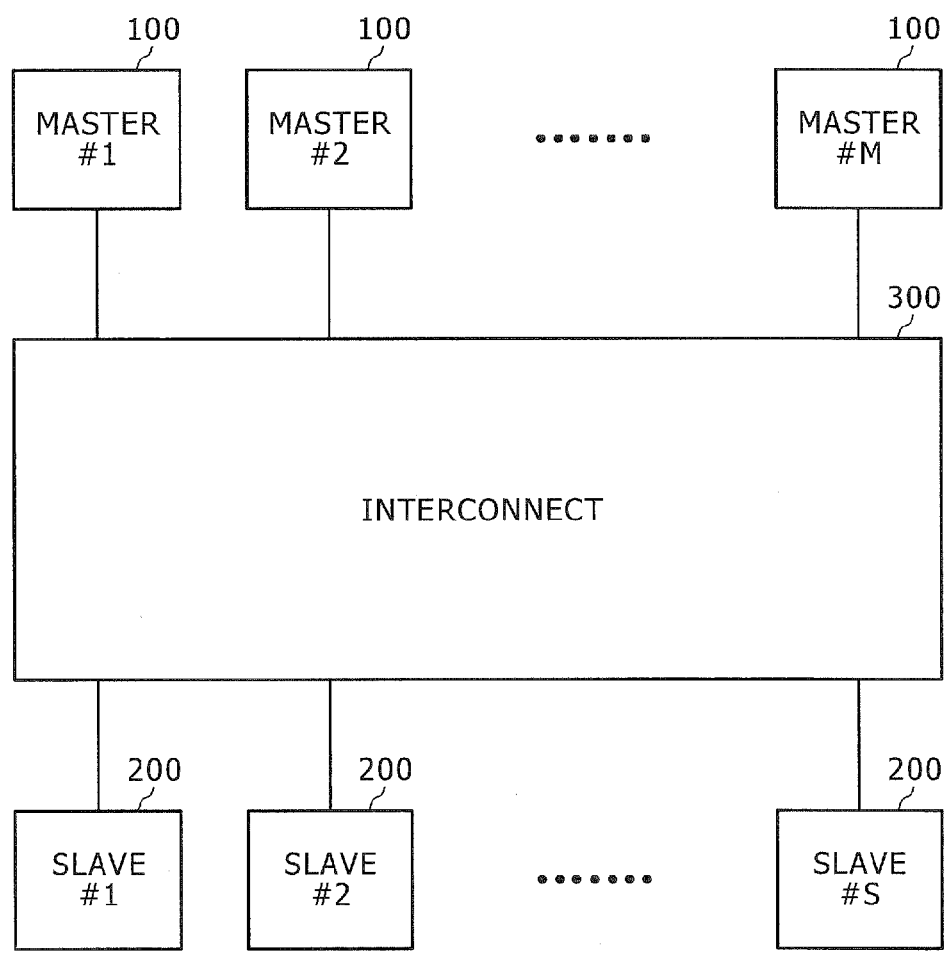
FIG. 1 is a diagram illustrating an example of overall configuration of a bus system in an embodiment of the present technology.

A description will be given below of a mode for carrying out the present technology (hereinafter referred to as an embodiment). It should be noted that the description will be given in the following order.
1. Embodiment (controlling a clock for each region on a transaction-by-transaction basis)
2. Modification Example 1. Embodiment Overall Configuration of the Bus System FIG. 1 is a diagram illustrating an example of overall configuration of a bus system in an embodiment of the present technology. In this bus system, a plurality of connection devices are connected to an interconnect 300 serving as a bus. The plurality of connection devices are classified into M masters 100 and S slaves 200. The masters 100 are connection devices adapted to take the initiative in data transfer. The slaves 200 are connection devices adapted to operate passively. A processor can be, for example, used as a connection device serving as a master. A memory can be, for example, used as a connection device serving as a slave. It should be noted that each of "M" and "S" is an integer equal to or greater than "1."

Figure 2:
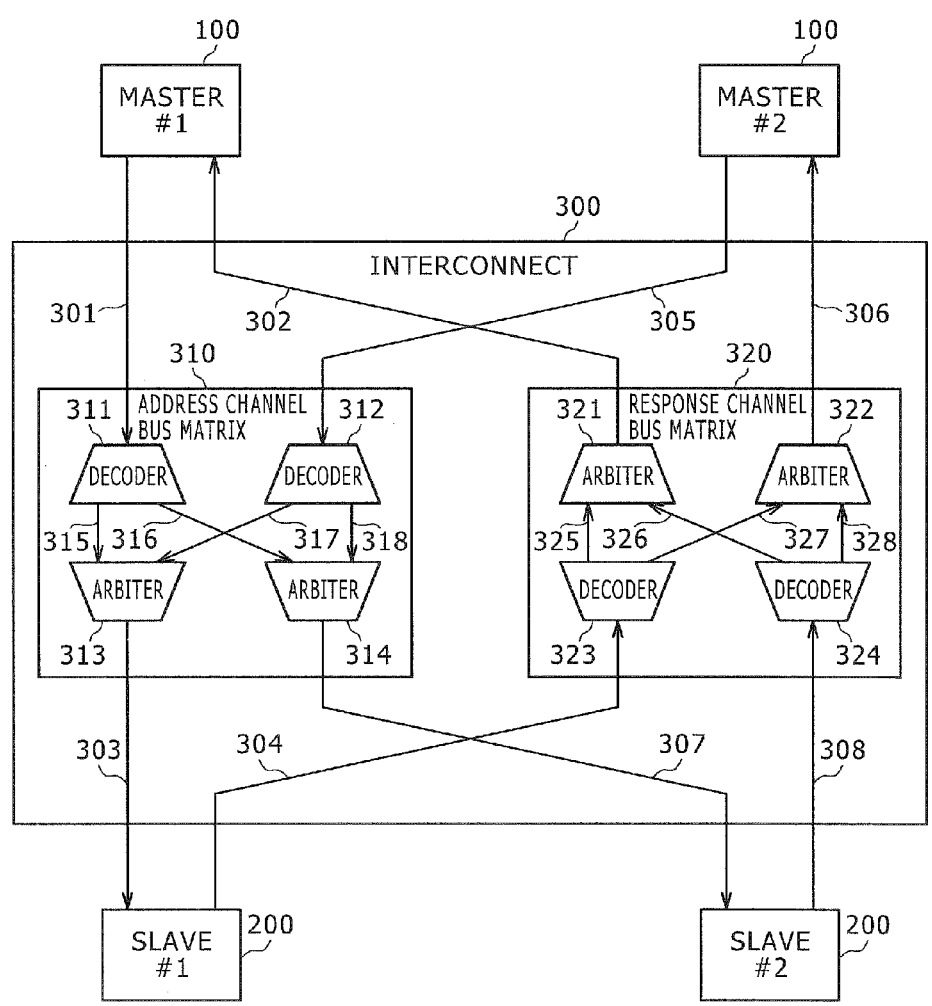
FIG. 2 is a diagram illustrating a configuration example of an interconnect in the embodiment of the present technology.

FIG. 2 is a diagram illustrating a configuration example of the interconnect 300 in the embodiment of the present technology. A description will be given here assuming that the bus system includes the two masters 100 and two slaves 200.

Further, we assume here that an AXI (Advanced eXtensible Interface) protocol is used as a typical example of a (split transaction) bus adapted to control data transfer requests and actual data transfer independently of each other. In this AXI protocol, a read address channel and read data channel are available as read operation paths. When a request including a read address is transferred from the master 100 to the slave 200 via the read address channel, read data is transferred from the slave 200 to the master 100 via the read data channel in response to the request. Further, in the AXI protocol, a write address channel, write data channel and write response channel are available as write operation paths. When a write request is transferred from the master 100 to the slave 200 via the write address channel and write data channel, the slave 200 performs a write operation in response to the request. Then, the result of the write operation is transferred from the slave 200 to the master 100 via the write response channel. In such a split transaction bus, a transaction to which no response has been made after the issuance of a request is referred to as an outstanding transaction.

The interconnect 300 includes an address channel bus matrix 310 and response channel bus matrix 320. The address channel bus matrix 310 is a channel adapted to handle transmission through the read address channel or write address channel and write data channel. The response channel bus matrix 320 is a channel adapted to handle transmission through the read data channel or write response channel.

The address channel bus matrix 310 includes decoders 311 and 312 and arbiters 313 and 314. The decoder 311 decodes a request sent from a master #1 through a signal line 301 and outputs the request to a signal line 315 when the request is addressed to a slave #1. The decoder 311 outputs the request to a signal line 316 when the request is addressed to a slave #2. The decoder 312 decodes a request sent from a master #2 through a signal line 305 and outputs the request to a signal line 317 when the request is addressed to the slave #1. The decoder 312 outputs the request to a signal line 318 when the request is addressed to the slave #2. The arbiter 313 arbitrates a request sent from the decoder 311 or 312 through the signal line 315 or 317 and outputs the request to a signal line 303. The arbiter 314 arbitrates a request sent from the decoder 311 or 312 through the signal line 316 or 318 and outputs the request to a signal line 307. It should be noted that each of the decoders 311 and 312 is an example of a request decoder according to the embodiment of the present technology. Further, each of the arbiters 313 and 314 is an example of a request arbiter according to the embodiment of the present technology.

The response channel bus matrix 320 includes arbiters 321 and 322 and decoders 323 and 324. The decoder 323 decodes a response sent from the slave #1 through a signal line 304 and outputs the response to a signal line 325 when the response is addressed to the master #1. The decoder 323 outputs the response to a signal line 327 when the response is addressed to the master #2. The decoder 324 decodes a response sent from the slave #2 through a signal line 308 and outputs the response to a signal line 326 when the response is addressed to the master #1. The decoder 324 outputs the response to a signal line 328 when the response is addressed to the master #2. The arbiter 321 arbitrates a response sent from the decoder 323 or 324 through the signal line 325 or 326 and outputs the response to a signal line 302. The arbiter 322 arbitrates a response sent from the decoder 323 or 324 through the signal line 327 or 328 and outputs the response to a signal line 306. It should be noted that each of the arbiters 321 and 322 is an example of a response arbiter as defined in the appended claims. Further, each of the decoders 323 and 324 is an example of a response decoder as defined in the appended claims.

That is, the decoder 311 is provided to be associated with the master #1, and the decoder 312 with the master #2. The arbiter 313 is provided to be associated with the slave #1, and the arbiter 314 with the slave #2. The decoder 323 is provided to be associated with the slave #1, and the decoder 324 with the slave #2. The arbiter 321 is provided to be associated with the master #1, and the arbiter 322 with the master #2.

In AXI, the read address channel and read data channel form a transaction, and the write address channel, write data channel and write response channel form a transaction.

In an AXI protocol, information transfer (e.g., data transfer) is conducted when a valid (VALID) signal and ready (READY) signal are both asserted in each channel. In the read address channel, for example, the master 100, i.e., the sender, sets, for example, the read address and asserts the valid signal (ARVALID) to "1." At this time, the slave 200, i.e., the receiver asserts the ready signal (ARREADY) to "1" when it is ready to receive the signal. This allows the read address and other information to be transferred when both the valid signal (ARVALID) and ready signal (ARREADY) are asserted to "1."

[Regions]

Figure 3:
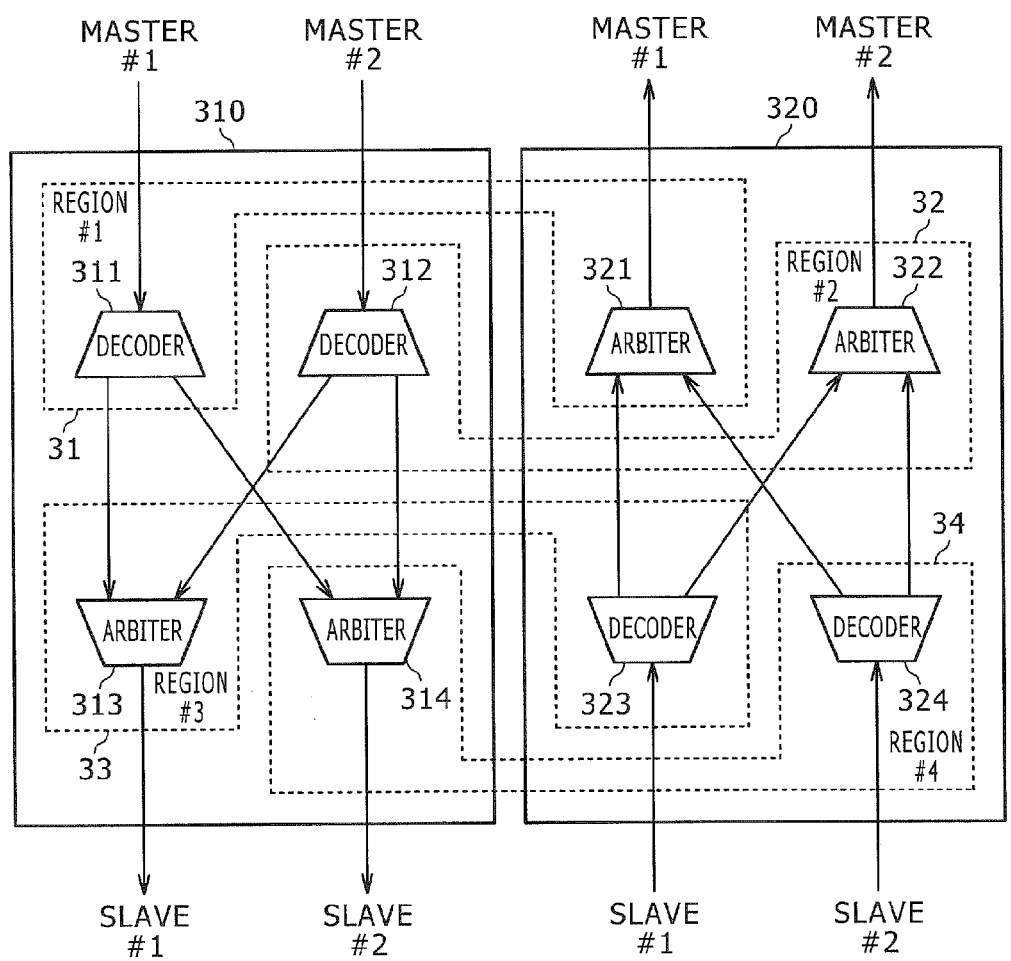
FIG. 3 is a diagram illustrating an example of classification into regions in the embodiment of the present technology.

FIG. 3 is a diagram illustrating an example of classification into regions in the embodiment of the present technology. The address channel bus matrix 310 and response channel bus matrix 320 are divided into four regions, each serving as a unit for controlling a clock. Regions #1 (31) and #2 (32) are located at an interface to which initiators are connected. These regions primarily have the capability to decode the destination of data transfer from an initiator. Regions #3 (33) and #4 (34) are located at an interface to which targets are connected. These regions primarily have the capability to arbitrate data from a plurality of initiators and transfer the data in that order to the target. Here, the term "initiator" refers to a master or slave that starts data transfer, and the term "target" to a master or slave that receives transferred data. That is, an address initiator is a master, and an address target is a slave. A response initiator is a slave, and a response target is a master.

In this example, the decoder 311 and arbiter 321 are classified into the region #1 (31), and the decoder 312 and arbiter 322 into the region #2 (32). Further, the decoder 323 and arbiter 313 are classified into the region #3 (33), and the decoder 324 and arbiter 314 into the region #4 (34).

Clocks independent of one another are supplied to these regions from the clock control unit which will be described later. Therefore, the decoder and arbiter belonging to a region operate on a clock different from that for the decoder and arbiter belonging to a different region. That is, it is possible to control the power consumption of each region by controlling a clock supplied to each region.

It should be noted that the decoders and arbiters should preferably be classified into the regions in such a manner as to ensure balance in the number of flip-flops per region.

Figure 4A:
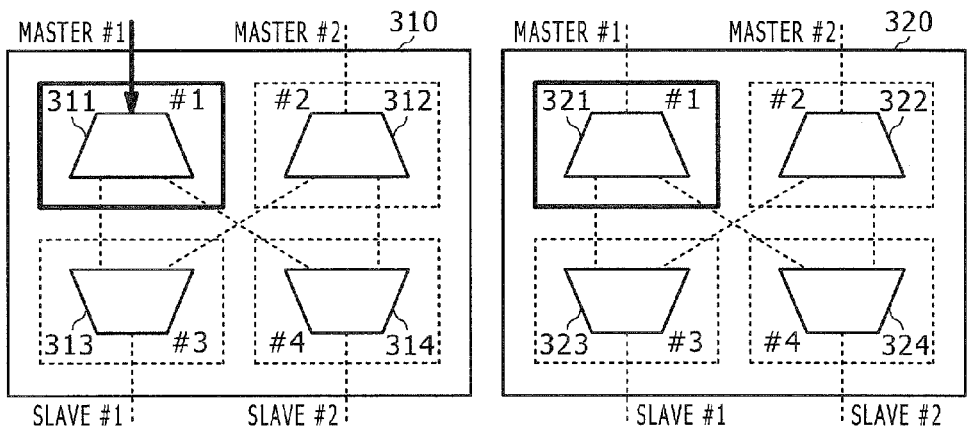
FIGS. 4A to 4C are diagrams illustrating examples of operational transitions of each of the regions in the embodiment of the present technology.
Figure 4B:
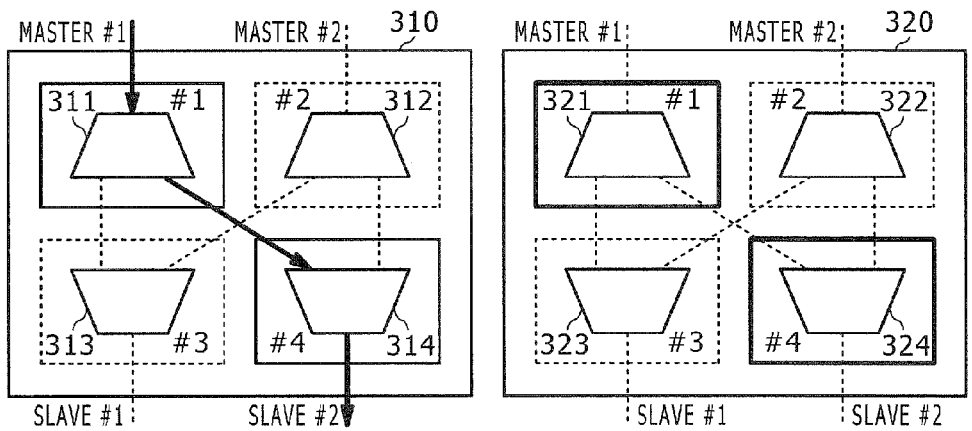
Figure 4C:
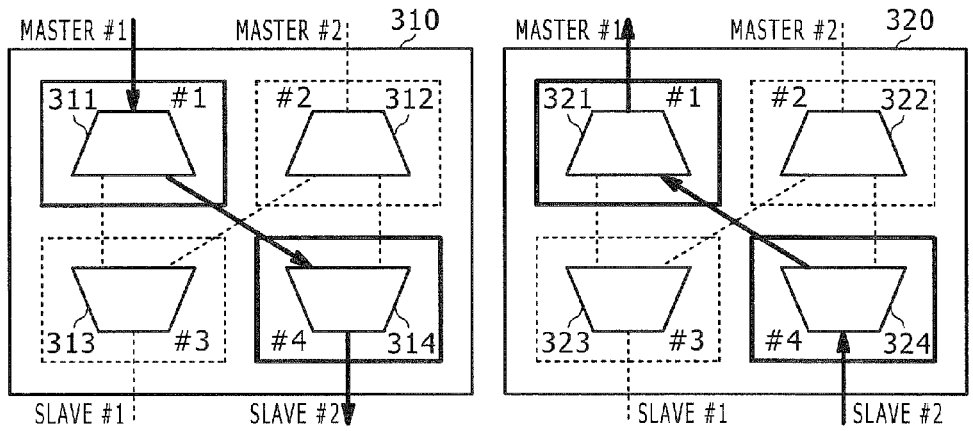

FIGS. 4A to 4C are diagrams illustrating examples of operational transitions of each of the regions in the embodiment of the present technology. For example, if data transfer begins from the master #1 to the slave #2, clock supply only to the region #1 begins first by an address input signal from the master #1 as illustrated in FIG. 4A. At this time, a clock is supplied not only to the decoder 311 but also to the arbiter 321.

The address is decoded by the decoder 311, and the fact that a clock is to be supplied next to the region #4 is notified to the clock control unit which will be described later. As a result, clock supply to the region #4 begins before the address reaches the region #4 as illustrated in FIG. 4B. At this time, a clock is supplied not only to the arbiter 314 but also to the decoder 324.

In this example, the regions in the address channel bus matrix 310 and response channel bus matrix 320 are commonized. Therefore, when a response is issued from a slave, a clock is already supplied to the regions #1 and #4 to be used. The response is transmitted to the master via the decoder 324 and arbiter 321 as illustrated in FIG. 4C. Then, if the response to the master is completed, and if there is no more transaction using the regions #1 and #4, clock supply is terminated.

[Clock Gating]

Figure 5:
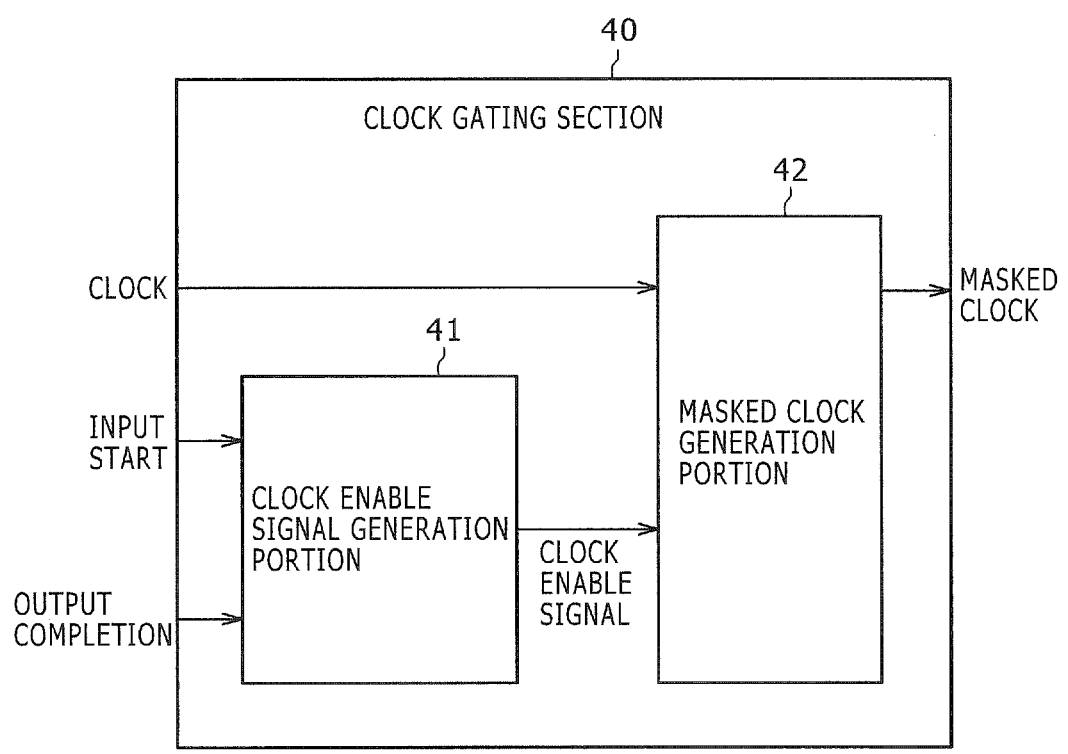
FIG. 5 is a diagram illustrating an example of basic configuration of a clock gating section of a clock control unit in the embodiment of the present technology.

FIG. 5 is a diagram illustrating an example of basic configuration of a clock gating section 40 of the clock control unit in the embodiment of the present technology. The clock gating section 40 is provided for each region and includes a clock enable signal generation portion 41 and masked clock generation portion 42.

The clock enable signal generation portion 41 counts the number of outstanding transactions in the associated region, thus generating a clock enable signal for the associated region. An input start signal and output completion signal are fed to the clock enable signal generation portion 41. The input start signal indicates that a request has been input to the associated region. The output completion signal indicates that a response to the request to the associated region has been output. The clock enable signal generation portion 41 has a counter and increments the number of outstanding transactions in the associated region when the request is input to the associated region. Then, the clock enable signal generation portion 41 decrements the number of outstanding transactions in the associated region when a response to the request to the associated region is output.

If the number of outstanding transactions counted as described above is zero, this means that there is no outstanding transaction in that region. Therefore, a clock enable signal is disabled. On the other hand, if the number of outstanding transactions counted as described above is one or more, this means that there is at least one outstanding transaction in that region. Therefore, the clock enable signal is enabled.

The masked clock generation portion 42 masks a clock by using the clock enable signal generated by the clock enable signal generation portion 41, thus generating a masked clock. That is, the masked clock generation portion 42 outputs the clock as it is as the masked clock if the clock enable signal is enabled. On the other hand, the masked clock generation portion 42 masks a clock and outputs the masked clock if the clock enable signal is disabled. In the latter case, therefore, a valid clock is not supplied to the associated region. As a result, the circuits belonging to that region stop operating synchronously with the clock.

FIG. 6 is a diagram illustrating examples of events triggering the start of input and completion of output for a target region in the clock gating section 40 in the embodiment of the present technology.

In the region #1, a transaction is started as a result of the issuance of a request from the master #1. This serves as a condition for the start of input. That is, when a signal is input that indicates the start of a transaction from the master #1, the number of outstanding transactions is incremented. On the other hand, the transaction is completed as a result of the arrival of the response to the master #1 in the region #1. This serves as a condition for the completion of output. That is, when a signal is input that indicates the completion of the transaction from the master #1, the number of outstanding transactions is decremented. As described above, in the region #1, the number of transactions from the master #1 that have been started but have yet to be completed is counted. When there are one or more such transactions, the clock of the region #1 is enabled.

In the region #2, a transaction is started as a result of the issuance of a request from the master #2. This serves as a condition for the start of input. That is, when a signal is input that indicates the start of a transaction from the master #2, the number of outstanding transactions is incremented. On the other hand, the transaction is completed as a result of the arrival of the response to the master #2 in the region #2. This serves as a condition for the completion of output. That is, when a signal is input that indicates the completion of the transaction from the master #2, the number of outstanding transactions is decremented. As described above, in the region #2, the number of transactions from the master #2 that have been started but have yet to be completed is counted. When there are one or more such transactions, the clock of the region #2 is enabled.

In the region #3, the operation is started as a result of the issuance of a command from the master #1 to the slave #1. This serves as a condition for the start of input. That is, when a signal is input that indicates the issuance of a command from the master #1 to the slave #1, the number of outstanding transactions is incremented. On the other hand, the operation is completed as a result of the completion of the command from the master #1 to the slave #1 in the region #3. This serves as a condition for the completion of output. That is, when a signal is input that indicates the completion of the command from the master #1 to the slave #1, the number of outstanding transactions is decremented. As described above, in the region #3, the number of commands that have been issued from the master #1 to the slave #1 but have yet to be completed is counted as a first condition. When there are one or more such commands, the clock of the region #3 is enabled.

Further, in the region #3, the operation is started as a result of the issuance of a command from the master #2 to the slave #1. This serves as a condition for the start of input. That is, when a signal is input that indicates the issuance of a command from the master #2 to the slave #1, the number of outstanding transactions is incremented. On the other hand, the operation is completed as a result of the completion of the command from the master #2 to the slave #1 in the region #3. This serves as a condition for the completion of output. That is, when a signal is input that indicates the completion of the command from the master #2 to the slave #1, the number of outstanding transactions is decremented. As described above, in the region #3, the number of commands that have been issued from the master #2 to the slave #1 but have yet to be completed is counted as a second condition. When there are one or more such commands, the clock of the region #3 is enabled.

In the region #3, it is possible that access may be issued from the masters #1 and #2 to the slave #1. This is the reason why there are the above two conditions. However, if either of the conditions is satisfied, that is, if there is an outstanding transaction from either the master #1 or #2, the clock of the region #3 is enabled.

In the region #4, the operation is started as a result of the issuance of a command from the master #1 to the slave #2. This serves as a condition for the start of input. That is, when a signal is input that indicates the issuance of a command from the master #1 to the slave #2, the number of outstanding transactions is incremented. On the other hand, the operation is completed as a result of the completion of the command from the master #1 to the slave #2 in the region #4. This serves as a condition for the completion of output. That is, when a signal is input that indicates the completion of the command from the master #1 to the slave #2, the number of outstanding transactions is decremented. As described above, in the region #4, the number of commands that have been issued from the master #1 to the slave #2 but have yet to be completed is counted as a first condition. When there are one or more such commands, the clock of the region #4 is enabled.

Further, in the region #4, the operation is started as a result of the issuance of a command from the master #2 to the slave #2. This serves as a condition for the start of input. That is, when a signal is input that indicates the issuance of a command from the master #2 to the slave #2, the number of outstanding transactions is incremented. On the other hand, the operation is completed as a result of the completion of the command from the master #2 to the slave #2 in the region #4. This serves as a condition for the completion of output. That is, when a signal is input that indicates the completion of the command from the master #2 to the slave #2, the number of outstanding transactions is decremented. As described above, in the region #4, the number of commands that have been issued from the master #2 to the slave #2 but have yet to be completed is counted as a second condition. When there are one or more such commands, the clock of the region #4 is enabled.

In the region #4, it is possible that access may be issued from the masters #1 and #2 to the slave #2. This is the reason why there are the above two conditions. However, if either of the conditions is satisfied, that is, if there is an outstanding transaction from either the master #1 or #2, the clock of the region #4 is enabled.

[Configuration of the Clock Control Unit]

Figure 7:
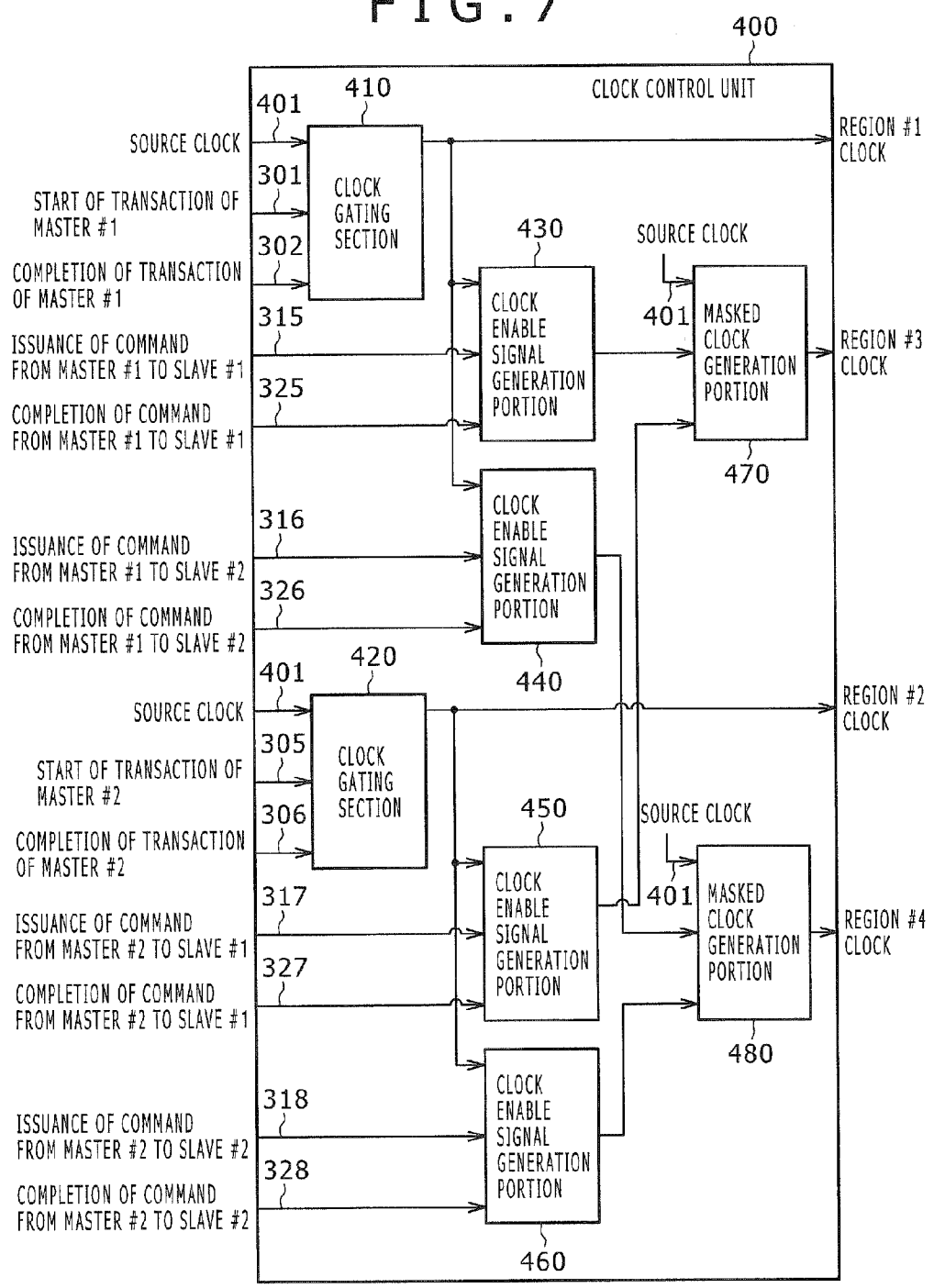
FIG. 7 is a diagram illustrating a configuration example of the clock control unit in the embodiment of the present technology.

FIG. 7 is a diagram illustrating a configuration example of the clock control unit 400 in the embodiment of the present technology. The clock control unit 400 is provided inside or outside the interconnect 300, acquiring necessary information from inside the interconnect 300 and thereby controlling the clocks of the different regions.

The clock control unit 400 includes clock gating sections 410 and 420, clock enable signal generation portions 430, 440, 450 and 460 and masked clock generation portions 470 and 480.

The clock gating section 410 supplies a clock for the region #1. The basic configuration of the clock gating section 410 is identical to that of the clock gating section 40 described with reference to FIG. 5. When fed with a signal indicating the start of a transaction from the master #1 via the signal line 301, the clock gating section 410 increments the number of outstanding transactions. On the other hand, when fed with a signal indicating the completion of the transaction from the master #1 via the signal line 302, the clock gating section 410 decrements the number of outstanding transactions. If the number of the outstanding transactions is one or more, a source clock fed from the signal line 401 is output as it is as a clock for the region #1. If the number of outstanding transactions is zero, the source clock fed from the signal line 401 is masked, and no valid clock is supplied. The detailed configuration of the clock gating section 410 will be described later with reference to figures.

The clock gating section 420 supplies a clock for the region #2. The clock gating section 420 is equivalent in configuration to the clock gating section 410 described above. When fed with a signal indicating the start of a transaction from the master #2 via the signal line 305, the clock gating section 420 increments the number of outstanding transactions. On the other hand, when fed with a signal indicating the completion of the transaction from the master #2 via the signal line 306, the clock gating section 420 decrements the number of outstanding transactions. If the number of the outstanding transactions is one or more, a source clock fed from the signal line 401 is output as it is as a clock for the region #2. If the number of outstanding transactions is zero, the source clock fed from the signal line 401 is masked, and no valid clock is supplied.

The clock enable signal generation portions 430 and 450 and masked clock generation portion 470 supply clocks for the region #3. The basic configuration of these portions combined is identical to that of the clock gating section 40 described with reference to FIG. 5. That is, the clock enable signal generation portions 430 and 450 correspond to the clock enable signal generation portion 41, and the masked clock generation portion 470 corresponds to the masked clock generation portion 42.

When fed with a signal indicating the issuance of a command from the master #1 to the slave #1 via the signal line 315, the clock enable signal generation portion 430 increments the number of outstanding transactions. On the other hand, when fed with a signal indicating the completion of the command from the master #1 to the slave #1 via the signal line 325, the clock enable signal generation portion 430 decrements the number of outstanding transactions. The clock enable signal generation portion 430 disables the clock enable signal if the number of the outstanding transactions is zero. On the other hand, the clock enable signal generation portion 430 enables the clock enable signal if the number of the outstanding transactions is one or more.

When fed with a signal indicating the issuance of a command from the master #2 to the slave #1 via the signal line 317, the clock enable signal generation portion 450 increments the number of outstanding transactions. On the other hand, when fed with a signal indicating the completion of the command from the master #2 to the slave #1 via the signal line 327, the clock enable signal generation portion 450 decrements the number of outstanding transactions. The clock enable signal generation portion 450 disables the clock enable signal if the number of the outstanding transactions is zero. On the other hand, the clock enable signal generation portion 450 enables the clock enable signal if the number of the outstanding transactions is one or more.

When either of the clock enable signals generated by the clock enable signal generation portions 430 and 450 is enabled, the masked clock generation portion 470 outputs a source clock fed via the signal line 401 as it is as a clock for the region #3. On the other hand, if both of the clock enable signals generated by the clock enable signal generation portions 430 and 450 are disabled, the masked clock generation portion 470 masks a source clock fed via the signal line 401, and no valid clock is supplied.

The clock enable signal generation portions 440 and 460 and masked clock generation portion 480 supply clocks for the region #4. The basic configuration of these portions combined is identical to that of the clock gating section 40 described with reference to FIG. 5. That is, the clock enable signal generation portions 440 and 460 correspond to the clock enable signal generation portion 41, and the masked clock generation portion 480 corresponds to the masked clock generation portion 42.

When fed with a signal indicating the issuance of a command from the master #1 to the slave #2 via the signal line 316, the clock enable signal generation portion 440 increments the number of outstanding transactions. On the other hand, when fed with a signal indicating the completion of the command from the master #1 to the slave #2 via the signal line 326, the clock enable signal generation portion 440 decrements the number of outstanding transactions. The clock enable signal generation portion 440 disables the clock enable signal if the number of the outstanding transactions is zero. On the other hand, the clock enable signal generation portion 440 enables the clock enable signal if the number of the outstanding transactions is one or more.

When fed with a signal indicating the issuance of a command from the master #2 to the slave #2 via the signal line 318, the clock enable signal generation portion 460 increments the number of outstanding transactions. On the other hand, when fed with a signal indicating the completion of the command from the master #2 to the slave #2 via the signal line 328, the clock enable signal generation portion 460 decrements the number of outstanding transactions. The clock enable signal generation portion 460 disables the clock enable signal if the number of the outstanding transactions is zero. On the other hand, the clock enable signal generation portion 460 enables the clock enable signal if the number of the outstanding transactions is one or more.

When either of the clock enable signals generated by the clock enable signal generation portions 440 and 460 is enabled, the masked clock generation portion 480 outputs a source clock fed via the signal line 401 as it is as a clock for the region #4. On the other hand, if both of the clock enable signals generated by the clock enable signal generation portions 440 and 460 are disabled, the masked clock generation portion 480 masks a source clock fed via the signal line 401, and no valid clock is supplied.

Figure 8:
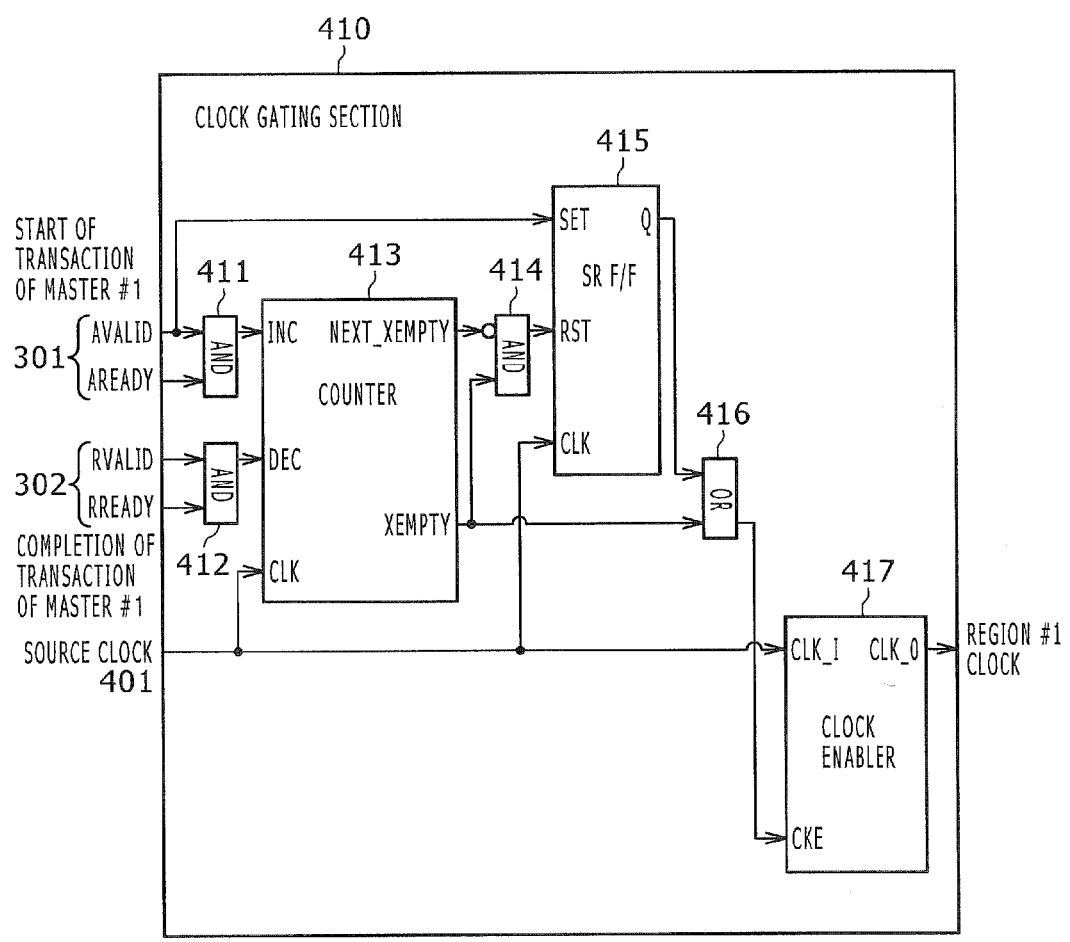
FIG. 8 is a diagram illustrating a configuration example of a clock gating section in the embodiment of the present technology.

FIG. 8 is a diagram illustrating a configuration example of the clock gating section 410 in the embodiment of the present technology. The clock gating section 410 includes logical product gates 411, 412 and 414, counter 413, SR flip-flop 415, logical sum gate 416 and clock enabler 417.

The logical product gate 411 is an AND gate adapted to generate a logical product of two signals, i.e., the valid signal (AVALID) from the master and the ready signal (AREADY) from the slave, for a request from the master #1. In the AXI protocol, the transfer of information is accomplished when the valid and ready signals are both asserted in each channel. Therefore, a logical product of the two signals is generated to detect the start of a transaction. The output of the logical product gate 411 is fed to the incrementing (INC) terminal of the counter 413.

The logical product gate 412 is an AND gate adapted to generate a logical product of two signals, i.e., the valid signal (RVALID) from the slave and the ready signal (RREADY) from the master, for a response to a request from the master #1. The output of the logical product gate 412 is fed to the decrementing (DEC) terminal of the counter 413.

The counter 413 performs counting according to an instruction fed thereto. This counter 413 has two input terminals, i.e., the incrementing (INC) terminal and decrementing (DEC) terminal. When the incrementing terminal is asserted, the counter 413 increments the internal count. When the decrementing terminal is asserted, the counter 413 decrements the internal count. These incrementing and decrementing operations are performed in synchronism with a clock fed to the clock (CLK) terminal. The counter 413 asserts the non-zero (XEMPTY) terminal if its internal count is not zero at the current timing. Further, the counter 413 asserts the next non-zero (NEXT_XEMPTY) terminal if its internal count is not zero at the next timing.

The logical product gate 414 is an AND gate adapted to generate a logical product of two values, i.e., the inverted value of the next non-zero terminal and the value of the non-zero terminal. That is, the output of the logical product gate 414 indicates the timing at which the internal count is one at the current timing and zero at the next timing.

The SR flip-flop 415 is set when a request from the master #1 is enabled, and reset when the count of the counter 413 changes from "1" to "0." This SR flip-flop 415 operates in synchronism with a clock fed to the clock (CLK) terminal and outputs its status to the output (Q) terminal.

The logical sum gate 416 is an OR gate adapted to generate a logical sum of two values, i.e., the value of the non-zero terminal of the counter 413 and the value of the output terminal of the SR flip-flop 415. That is, this logical sum gate 416 enables the clock enable signal and supplies it to the clock enabler 417 when the internal count of the counter 413 is not zero or when the SR flip-flop 415 is set.

The clock enabler 417 masks the source clock according to the clock enable signal supplied from the logical sum gate 416. That is, this clock enabler 417 supplies the source clock as it is as a clock for the region #1 when the clock enable signal is enabled. The clock enabler 417 does not supply the source clock when the clock enable signal is disabled.

It should be noted that while a configuration example of the clock gating section 410 has been shown here, the clock gating section 420 is configured in the same manner.

Figure 9:
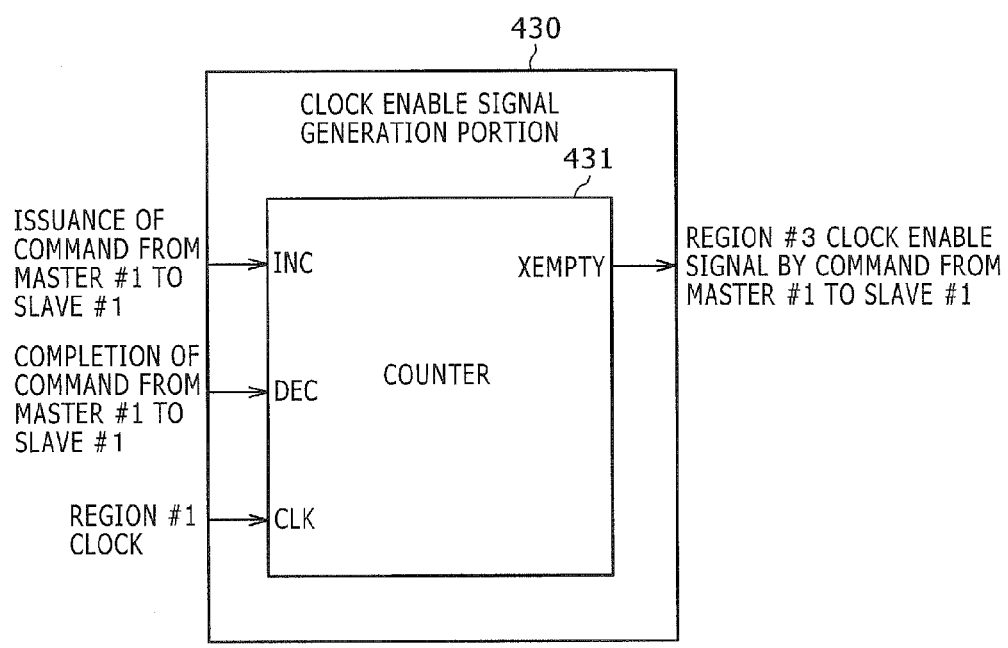
FIG. 9 is a diagram illustrating a configuration example of a clock enable signal generation portion in the embodiment of the present technology.

FIG. 9 is a diagram illustrating a configuration example of the clock enable signal generation portion 430 in the embodiment of the present technology. This clock enable signal generation portion 430 includes a counter 431.

The counter 431 performs counting according to an instruction fed thereto. This counter 431 has two input terminals, i.e., an incrementing (INC) terminal and decrementing (DEC) terminal. When the incrementing terminal is asserted, the counter 431 increments the internal count. When the decrementing terminal is asserted, the counter 431 decrements the internal count. These incrementing and decrementing operations are performed in synchronism with a clock fed to the clock (CLK) terminal. A clock for the region #1 supplied from the clock gating section 410 is fed to the clock terminal. When the signal line 315 or 325 is active, the region #1 is also active, thus providing reduced power consumption of the clock enable signal generation portion 430 itself. The counter 431 asserts the non-zero (XEMPTY) terminal if its internal count is not zero at the current timing.

In the clock enable signal generation portion 430, the counter 431 increments the number of outstanding transactions when a signal indicating the issuance of a command from the master #1 to the slave #1 is fed to the incrementing terminal. On the other hand, the counter 431 decrements the number of outstanding transactions when a signal indicating the completion of the command from the master #1 to the slave #1 is fed to the decrementing terminal. If the internal count of the counter 431 resulting from these operations is not zero, one of the clock enable signals for the region #3 is enabled. It should be noted that the clock enable signal generation portion 450 also generates clock enable signals for the region #3. The masked clock generation portion 470 generates a logical sum of these clock enable signals.

It should be noted that while a configuration example of the clock enable signal generation portion 430 has been shown here, each of the clock enable signal generation portions 440, 450 and 460 is configured in the same manner.

Figure 10:
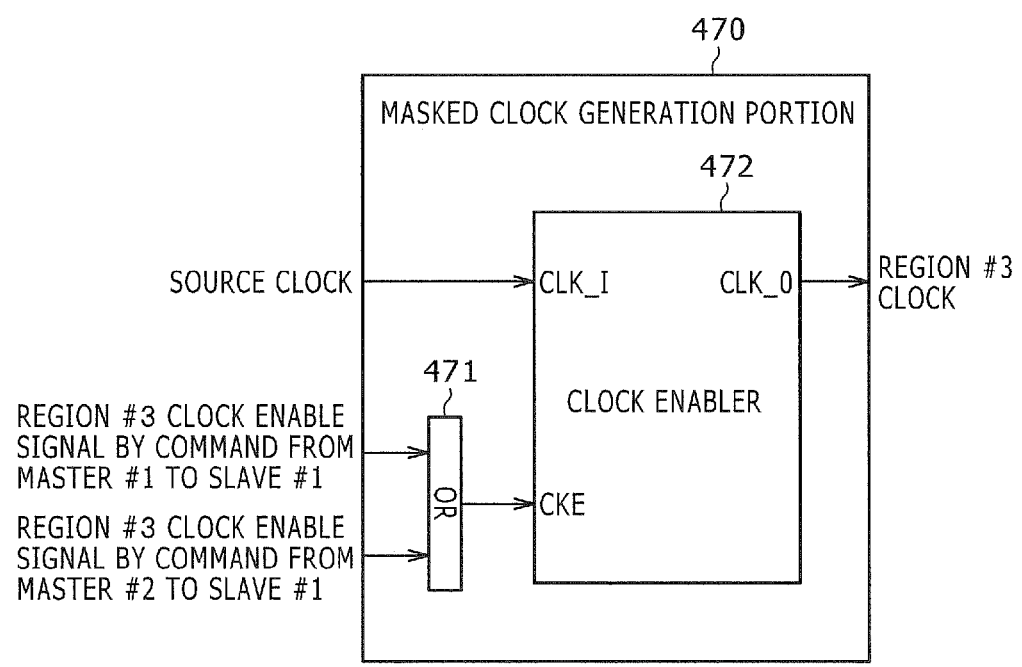
FIG. 10 is a diagram illustrating a configuration example of a masked clock generation portion in the embodiment of the present technology.

FIG. 10 is a diagram illustrating a configuration example of the masked clock generation portion 470 in the embodiment of the present technology. The masked clock generation portion 470 includes a logical sum gate 471 and clock enabler 472.

The logical sum gate 471 is an OR gate adapted to generate a logical sum of two signals, i.e., the clock enable signals generated by the clock enable signal generation portions 430 and 450. The output of the logical sum gate 471 is fed to the clock enable terminal of the clock enabler 472 as a clock enable signal for the region #3.

The clock enabler 472 masks the source clock according to the clock enable signal supplied from the logical sum gate 471. That is, the clock enabler 472 supplies the source clock as it is as a clock for the region #3 when the clock enable signal is enabled. The clock enabler 472 does not supply the source clock when the clock enable signal is disabled.

It should be noted that while a configuration example of the masked clock generation portion 470 has been shown here, the masked clock generation portion 480 is configured in the same manner.

As described above, the embodiment of the present technology divides the inside of the interconnect 300 into regions, thus making it possible to control a clock to be supplied to each region on a transaction-by-transaction basis. That is, a clock is dynamically supplied only to the path necessary for the transaction by using bus access from the master as a trigger, thus contributing to reduced power consumption of the bus system. This approach supplies a clock to the minimum necessary circuit portions only while a transaction is alive, thus keeping the power consumption resulting from the clock to a minimum.

2. Modification Example

Figure 11:
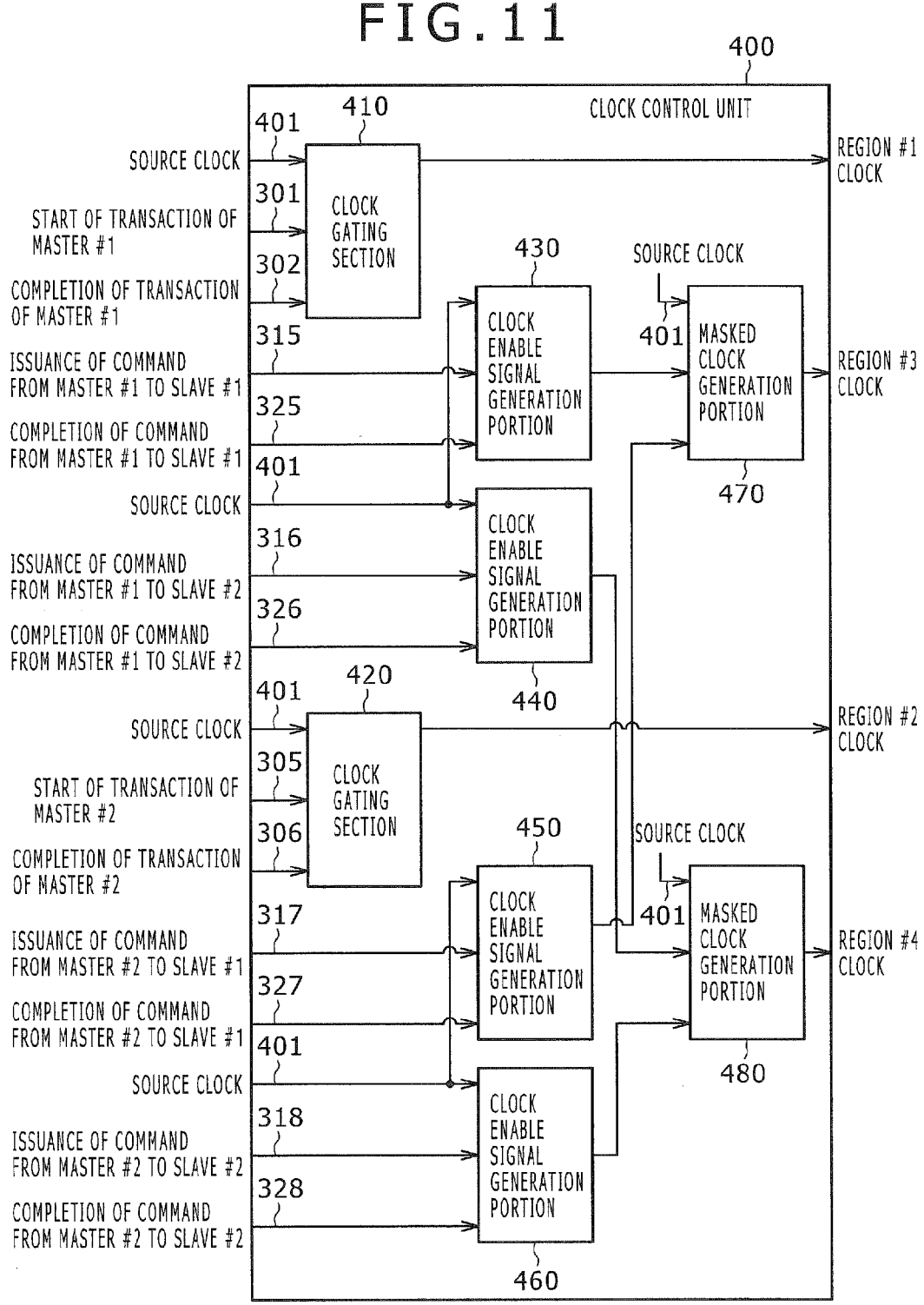
FIG. 11 is a diagram illustrating a modification example of the clock control unit in the embodiment of the present technology.

FIG. 11 is a diagram illustrating a modification example of the clock control unit 400 in the embodiment of the present technology. In the clock control unit 400 shown in FIG. 7, a clock for the region #1 is fed to the clock enable signal generation portions 430 and 440, and a clock for the region #2 to the clock enable signal generation portions 450 and 460. In contrast, in this modification example, the source clock fed from the signal line 401 is supplied to the clock enable signal generation portions 430, 440, 450 and 460. While this may cause the clock enable signal generation portions 430, 440, 450 and 460 to consume power in themselves, this provides an advantageous effect of providing flexibility in circuit layout on the chip.

It should be noted that the above embodiment is merely an example of implementing the present technology. There are correspondences between the features of the embodiment of the present technology and the specific features of the technology set forth in the claims. Similarly, there are correspondences between the specific features of the technology set forth in the claims and the identically named features of the embodiment of the present technology. It should be noted, however, that the present technology is not limited to the embodiment but may be implemented by modifying the embodiment in various manners without departing from the scope of the present technology.

It should be noted that the present technology may have the following configurations.

(1)

A clock gating circuit including:

a clock enable signal generation portion adapted to count the number of outstanding transactions in each of a plurality of regions into which a bus system is divided so as to generate a clock enable signal for each of the plurality of regions; and a masked clock generation portion adapted to mask a clock by using the clock enable signal for each of the plurality of regions so as to generate a masked clock.

(2)

The clock gating circuit of feature (1), in which the clock enable signal generation portion increments the number of the outstanding transactions when a request is input to each of the plurality of regions, and decrements the number of the outstanding transactions when a response to the request is output therefrom so as to count the number of the outstanding transactions, and the masked clock generation portion masks the clock and outputs the masked clock when the number of the outstanding transactions is zero, and outputs the clock as it is as the masked clock when the number of the outstanding transactions is one or more.

(3)

The clock gating circuit of feature (1) or (2), in which the clock enable signal generation portion includes a counter adapted to increment the number of the outstanding transactions when a request is input to each of the plurality of regions and decrement the number of the outstanding transactions when a response to the request is output therefrom so as to count the number of the outstanding transactions, and the masked clock generation portion includes a clock enabler adapted to mask the clock and output the masked clock when the number of the outstanding transactions is zero, and output the clock as it is as the masked clock when the number of the outstanding transactions is one or more.

(4)

A bus system including:

a plurality of request decoders each of which is provided to be associated with one of a plurality of masters so as to decode a request from the associated master;

a plurality of request arbiters each of which is provided to be associated with one of a plurality of slaves so as to arbitrate requests decoded by the plurality of request decoders and output the requests to the associated slave;

a plurality of response decoders each of which is provided to be associated with one of the plurality of slaves so as to decode a response from the associated slave;

a plurality of response arbiters each of which is provided to be associated with one of the plurality of masters so as to arbitrate responses decoded by the plurality of response decoders and output the responses to the associated master;

a clock enable signal generation portion adapted to count the number of outstanding transactions in each of the regions so as to generate a clock enable signal for each of the plurality of regions by classifying the plurality of request decoders and the plurality of response arbiters in such a manner that the request decoder and response arbiter associated with the same master are classified into the same region or by classifying the plurality of request arbiters and the plurality of response decoders in such a manner that the request arbiter and response decoder associated with the same slave are classified into the same region; and a masked clock generation portion adapted to mask a clock by using the clock enable signal for each of the plurality of regions so as to generate a masked clock.

(5)

The bus system of feature (4), in which the clock enable signal generation portion increments the number of the outstanding transactions when a request is input to each of the plurality of regions, and decrements the number of the outstanding transactions when a response to the request is output therefrom so as to count the number of the outstanding transactions, and the masked clock generation portion masks the clock and outputs the masked clock when the number of the outstanding transactions is zero, and outputs the clock as it is as the masked clock when the number of the outstanding transactions is one or more.

(6)

The bus system of feature (4) or (5), in which the clock enable signal generation portion includes a counter adapted to increment the number of the outstanding transactions when a request is input to each of the plurality of regions and decrement the number of the outstanding transactions when a response to the request is output therefrom so as to count the number of the outstanding transactions, and the masked clock generation portion includes a clock enabler adapted to mask the clock and output the masked clock when the number of the outstanding transactions is zero, and output the clock as it is as the masked clock when the number of the outstanding transactions is one or more.

The present disclosure contains subject matter related to that disclosed in Japanese Priority Patent Application JP 2011-248148 filed in the Japan Patent Office on Nov. 14, 2011, the entire content of which is hereby incorporated by reference.

What is claimed is:

1. A clock gating circuit comprising:

a clock enable signal generation portion adapted to count a number of outstanding transactions in each of a plurality of regions into which a bus system is divided so as to generate a clock enable signal for each of the plurality of regions; and a masked clock generation portion comprising:

a logical sum gate adapted to generate a logical sum of clock enable signals generated by the clock enable signal generation portion; and a clock enabler adapted to mask a clock by using the logical sum supplied from the logical sum gate for each of the plurality of regions so as to generate a masked clock to be supplied to respective regions of the plurality of regions.

2. The clock gating circuit of claim 1, wherein the clock enable signal generation portion increments the number of the outstanding transactions when a request is input to each of the plurality of regions, and decrements the number of the outstanding transactions when a response to the request is output therefrom so as to count the number of the outstanding transactions, and the clock enabler masks the clock and outputs the masked clock when the number of the outstanding transactions is zero, and outputs the clock without masking when the number of the outstanding transactions is one or more.

3. The clock gating circuit of claim 1, wherein the clock enable signal generation portion includes a counter adapted to increment the number of the outstanding transactions when a request is input to each of the plurality of regions and decrement the number of the outstanding transactions when a response to the request is output therefrom so as to count the number of the outstanding transactions, and the clock enabler masks the clock and outputs the masked clock when the number of the outstanding transactions is zero, and outputs the clock without masking when the number of the outstanding transactions is one or more.

4. The clock gating circuit of claim 1, wherein the clock is independent for each of the plurality of regions.

5. The clock gating circuit of claim 1, wherein, when the masked clock is generated, a valid clock signal is not supplied to an associated region of the plurality of regions.

6. A bus system comprising:
- a plurality of request decoders each of which is provided to be associated with one of a plurality of masters so as to decode a request from the associated master;
- a plurality of request arbiters each of which is provided to be associated with one of a plurality of slaves so as to arbitrate requests decoded by the plurality of request decoders and output the requests to the associated slave;
- a plurality of response decoders each of which is provided to be associated with one of the plurality of slaves so as to decode a response from the associated slave;
- a plurality of response arbiters each of which is provided to be associated with one of the plurality of masters so as to arbitrate responses decoded by the plurality of response decoders and output the responses to the associated master;
- a clock enable signal generation portion adapted to count a number of outstanding transactions in each of a plurality of regions so as to generate a clock enable signal for each of the plurality of regions by classifying the plurality of request decoders and the plurality of response arbiters such that a request decoder and a response arbiter associated with a same master of the plurality of masters are classified into a same region of the plurality of regions or by classifying the plurality of request arbiters and the plurality of response decoders such that a request arbiter and a response decoder associated with a same slave of the plurality of slaves are classified into the same region; and
- a masked clock generation portion comprising:
  - a logical sum gate adapted to generate a logical sum of clock enable signals generated by the clock enable signal generation portion; and
  - a clock enabler adapted to mask a clock by using the logical sum supplied from the logical sum gate for each of the plurality of regions so as to generate a masked clock to be supplied to respective regions of the plurality of regions.

7. The bus system of claim 6, wherein the clock enable signal generation portion increments the number of the outstanding transactions when a request is input to each of the plurality of regions, and decrements the number of the outstanding transactions when a response to the request is output therefrom so as to count the number of the outstanding transactions, and the clock enabler masks the clock and outputs the masked clock when the number of the outstanding transactions is zero, and outputs the clock without masking when the number of the outstanding transactions is one or more.

8. The bus system of claim 6, wherein the clock enable signal generation portion includes a counter adapted to increment the number of the outstanding transactions when a request is input to each of the plurality of regions and decrement the number of the outstanding transactions when a response to the request is output therefrom so as to count the number of the outstanding transactions, and the clock enabler masks the clock and outputs the masked clock when the number of the outstanding transactions is zero, and outputs the clock without masking when the number of the outstanding transactions is one or more.

9. The bus system of claim 6, wherein a first set of regions in the plurality of regions are located at an interface to which one or more initiators are connected and a second set of regions in the plurality of regions are located at an interface to which one or more targets are connected.

10. The bus system of claim 9, wherein the one or more initiators comprise a first master of the plurality of masters or a first slave of the plurality of slaves that initiates data transfer and the one or more targets comprises a second master of the plurality of masters or a second slave of the plurality of slaves that receives transferred data.

* * * * *